United States Patent [19]

Furukubo

[11] 4,160,363
[45] Jul. 10, 1979

[54] APPARATUS FOR PURIFYING EXHAUST GAS

[75] Inventor: Tatsumi Furukubo, Susono, Japan

[73] Assignee: Toyota Jidosha Kogyo Kabushiki Kaisha, Aichi, Japan

[21] Appl. No.: 837,100

[22] Filed: Sep. 28, 1977

[30] Foreign Application Priority Data

Jul. 22, 1977 [JP] Japan .............................. 52-087263

[51] Int. Cl.² .............................................. F01N 3/10
[52] U.S. Cl. ......................................... 60/290; 60/305
[58] Field of Search .................. 60/289, 290, 304, 305

[56] References Cited

U.S. PATENT DOCUMENTS 4,077,209  3/1978  Suzuki ..................................... 60/289

FOREIGN PATENT DOCUMENTS 2617245  7/1977  Fed. Rep. of Germany ............. 60/293

Primary Examiner—Douglas Hart
Attorney, Agent, or Firm—Stevens, Davis, Miller & Mosher

[57] ABSTRACT

Disclosed is an apparatus for purifying exhaust gas discharged from an internal combustion engine having four cylinders. The apparatus comprises: an exhaust pipe provided with two entrance pipes, each of which is communicated with two engine cylinders, respectively, and a joint joining the entrance pipes together; a three way catalyzer for converting the exhaust gas disposed at a position downstream of the joint; a secondary air device for supplying secondary air into the exhaust pipe device, the secondary air device being communicated with the first entrance pipe; an air switching device, the entrance of which is communicated with the secondary air device and the exit of which is communicated with the second entrance pipe, for switching secondary air, and; a device for detecting the operating characteristics of the engine and for actuating the air switching device.

Utilizing this apparatus, while the engine is cool, a sufficient amount of secondary air is continuously supplied into all of the entrance pipes and can overcome the increase of HC and CO emissions caused by the operation of the choke in the carburetor. On the other hand, when the engine is warmed up, only secondary air is supplied into the first entrance pipe and this causes an oscillation of the secondary air fuel ratio in the three way catalyzer. As a result, a high converting efficiency can be obtained.

10 Claims, 5 Drawing Figures

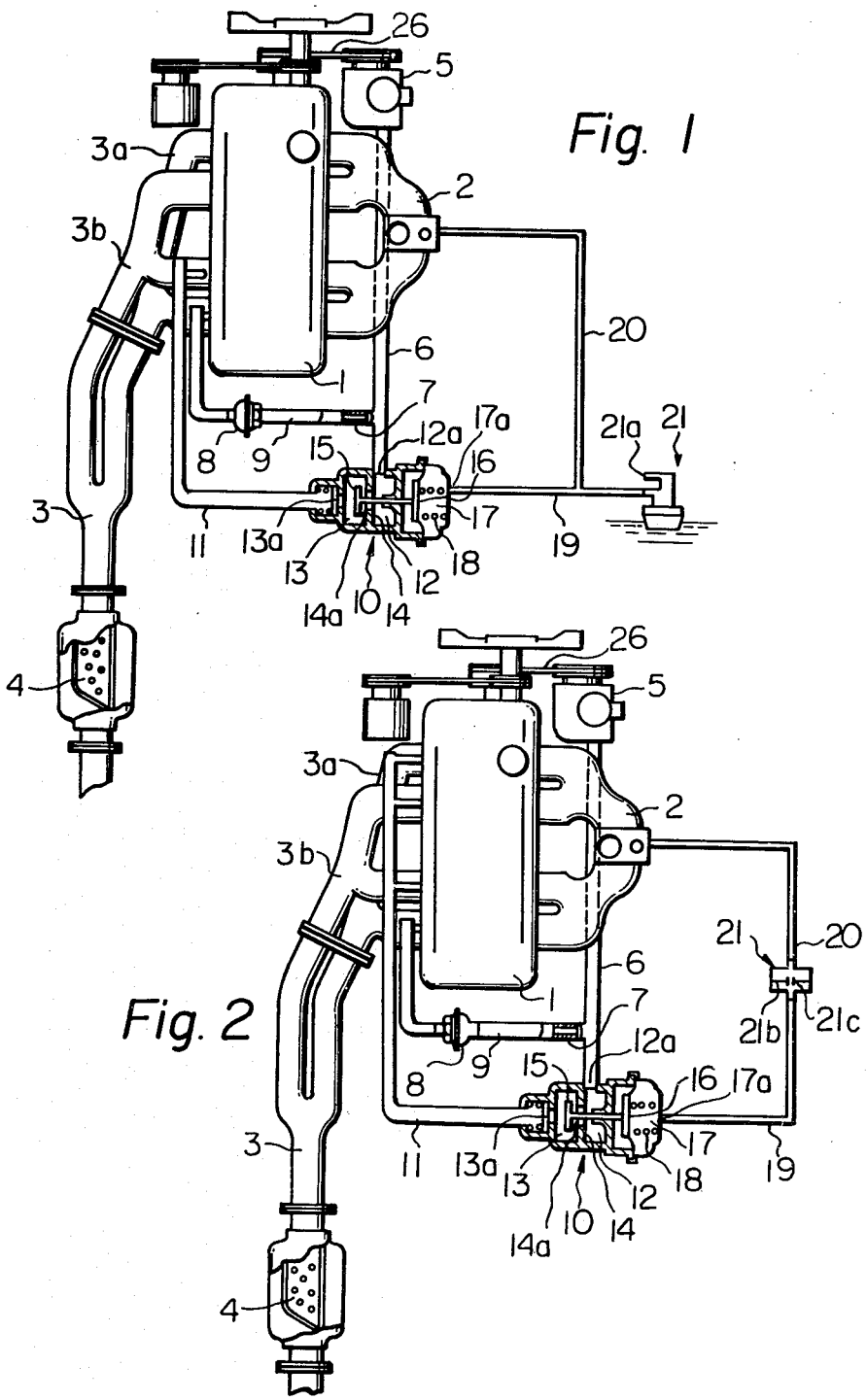

APPARATUS FOR PURIFYING EXHAUST GAS

DESCRIPTION OF THE INVENTION

This invention relates to an apparatus for purifying exhaust gas discharged from an internal combustion engine, especially to a purifying apparatus which supplies a rich mixture into engine cylinders and secondary air to a position upstream of a catalytic converter disposed within an exhaust system of the engine.

BACKGROUND OF THE INVENTION

Well-known are internal combustion engines which are provided with a three way catalyzer in their exhaust systems for reducing undesirable components, such as hydrocarbons (HC), carbon monoxide (CO) and nitrogen oxides ($NO_x$), contained in exhaust gas. The above-mentioned three way catalyzer achieve their highest converting efficiency when the secondary air fuel ratio is suitably controlled so that it is maintained at the stoichiometric air fuel ratio. (The term "secondary air fuel ratio" as used herein is defined as the total amount of air, including secondary air, to the amount of the fuel fed into the engine.) Accordingly, many types of secondary air control devices have been proposed for maintaining the secondary air fuel ratio at the stoichiometric air fuel ratio. However, these proposed devices are intended to control the secondary air fuel ratio so that it coincides with the stoichiometric air fuel ratio at all times and are very complicated. Such complicated devices are difficult to adjust and maintain, and may be easily damaged. In addition, at least one part of such devices is always exposed to a high temperature caused by the exhaust gas and may also be thermally damaged thereby.

To eliminate the above-mentioned defects, the inventor of the present invention has conducted tests and confirmed that the alternate oscillation of the secondary air fuel ratio between the lean side and the rich side of the stoichiometric air fuel ratio can generate a higher converting efficiency of the three way catalyzer for reducing undesirable components, such as HC, CO and $NO_x$, than maintaining the secondary air fuel ratio at the stoichiometric air fuel ratio.

SUMMARY OF THE INVENTION

An object of the present invention is to provide an apparatus for purifying exhaust gas with a high converting efficiency which has a simple construction and which can alternate the secondary air fuel ratio between the lean side and the rich side of the stoichiometric air fuel ratio.

Another object of the present invention is to provide an apparatus for purifying exhaust gas which can supply a large amount of secondary air while the engine is cold so that the increase of HC and CO emissions caused by the enrichment of the intake air fuel ratio due to the operation of the choke in the carburetor can be overcome, and that the converting efficiency can be maintained at a high level.

The above-mentioned objects are achieved by an apparatus for purifying exhaust gas discharged from an internal combustion engine having a plurality of cylinders, which apparatus comprises: an exhaust pipe device provided with two entrance pipes, one of which is communicated with one half of the engine cylinders and the other of which is communicated with the other half of the engine cylinders, a joint joining the entrance pipes together and an exit pipe extending from the joint a three way catalyzer for converting the exhaust gas disposed at a position downstream of the joint; a secondary air device for supplying secondary air into the exhaust pipe device, the secondary air device being communicated with the first entrance pipe of the exhaust pipe device; an air switching device, the entrance of which is communicated with the secondary air device and the exit of which is communicated with the second entrance pipe, for switching secondary air from the secondary air device toward the second entrance pipe, and; a device for detecting the operating characteristics of the engine and for actuating the air switching device. During the time the engine is cold and the detecting-actuating device detects that the engine has not reached a predetermined normal temperature range, secondary air is continuously supplied from the secondary air device into both of the entrance pipes of the exhaust pipe device so that a large amount of secondary air is supplied to the three way catalyzer disposed at the position downstream of the joint of the exhaust pipe device. The amount of the secondary air is selected to overcome the increase of HC and CO emissions caused by the operation of the choke in the carburetor, so as to maintain the high converting efficiency and to raise the temperature of the three way catalyzer to the predetermined activating temperature in a short time. When the engine is warmed up, and this fact is detected by the detecting-actuating device, the supply of secondary air through the air switching device is stopped. Then only the first entrance pipe, is supplied the secondary air through the secondary air device. This causes secondary air to be supplied through the first entrance pipe and no secondary air is supplied at all through the second entrance pipe. The secondary air fuel ratio measured at the three way catalyzer disposed at the position downstream of the joint of the exhaust pipe device is alternately oscillated between the rich side and the lean side of the stoichiometric air fuel ratio, and this results in a very high converting efficiency as mentioned above. It is preferable to design the apparatus so that, when the engine is warmed up the average of the secondary air fuel ratio is a value which is rather leaner than the stoichiometric air fuel ratio for effectively converting undesirable components such as HC, CO and $NO_x$.

The above-mentioned objects as well as novel features of the present invention will become more fully apparent from the detailed description of the invention, set forth below, with reference to the accompanying drawings. It is to be understood, however, that the drawings are for the purpose of illustration only and are not intended to be a definition of the limits of the invention.

BRIEF DESCRIPTION OF THE DRAWINGS

FIG. 1 is a plan view of an apparatus for purifying exhaust gas discharged from an internal combustion engine according to the present invention, wherein a by-pass valve disposed in a cooling system of the engine is utilized as a detecting-actuating device;

FIG. 2 is a plan view of another apparatus for purifying exhaust gas discharged from an internal combustion engine according to the present invention, wherein a delay valve is utilized as a detecting-actuating device;

DETAILED DESCRIPTION OF THE INVENTION

Figure 3:
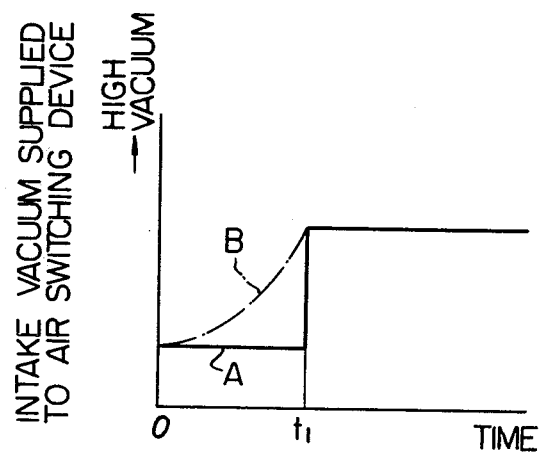
FIG. 3 is an operational diagram which shows the relationship between time and intake vacuum supplied to an air switching device according to the present invention.

Referring to FIGS. 1 and 2, an internal combustion engine 1 has intake manifold 2 and a dual type exhaust pipe 3 which comprises two entrance pipes 3a and 3b, each of which communicates with two exhaust ports (not shown) of the engine cylinders (not shown). The dual type exhaust pipe 3 is provided with a catalytic converter 4 which includes a three way catalyzer (not shown) at a position downstream of the conjunction of the entrance pipes 3a and 3b. An air pump 5 is driven by a crankshaft (not shown) of the engine 1 via a belt transmitting device 26 and supplies secondary air to a secondary air pipe 6. The secondary air pipe 6 is communicated with the entrance pipe 3a through a communicating pipe 9 which is provided with a throttling element 7 and a check valve 8 for preventing reverse flow. The secondary air pipe 6 is also communicated with the entrance pipe 3b through an air switching device 10 and a communicating pipe 11. The communicating pipe 11 may be communicated with only one exhaust port (not shown) of the engine 1 which is communicated with the exhaust pipe 3b as shown in FIG. 1. However, in some cases, the communicating pipe 11 may be communicated with all of the exhaust ports (not shown) of the engine 1 so as to communicate with both of the entrance pipes 3a, 3b. Utilizing the latter construction, a large amount of secondary air can be supplied to the exhaust pipe device 3 while the engine is cold.

The air switching device 10 comprises: an upper chamber 12 which communicates with the secondary air pipe 6 via an inlet port 12a; a lower chamber 13 which communicates with the communicating pipe 11 via an outlet port 13a; partition 14 which separates the upper chamber 12 and the lower chamber 13 and which has a valve seat 14a mounted thereon, and; a valve 15 which displaces between a position separated from the outlet port 13a and the valve seat 14a. The valve 15 is connected to a diaphragm 16, which forms a working chamber 17, and is actuated by a vacuum pressure supplied into the working chamber 17 through a vacuum port 17a and by a spring 18 via the diaphragm 16.

The vacuum port 17a of the air switching device 10 is communicated with the intake manifold 2 of the engine 1 through a detecting-actuating device 21, and vacuum pipes 19 and 20. The detecting-actuating device 21 shown in FIG. 1 is a by-pass valve disposed in a cooling system of the engine and has an element (not shown) for detecting the temperature of the cooling water. During the time the temperature of the cooling water is detected as being lower than a predetermined temperature, the by-pass valve 21 releases the vacuum supplied through the vacuum pipe 20 into the atmosphere via a release port 21a, so that secondary air is supplied into the second entrance pipe 3b through the air switching device 10. When the temperature of the cooling water is detected as being within a predetermined range, the by-pass valve 21 supplies a vacuum into the air switching device 10 through the vacuum pipes 20 and 19, so that the valve 15 is positioned on the valve seat 14a and stops the supply of secondary air into the second entrance pipe 3b through the air switching device. The detecting-actuating device 21 shown in FIG. 2 is a delay valve comprising a gas filter 21b and an orifice 21c. The delay valve 21 transmits the vacuum supplied from vacuum pipe 20 into the vacuum pipe 19 with a predetermined delay time defined by the gas filter 21b and orifice 21c. The air switching device 10 is actuated by the vacuum in a similar manner as that described above with reference to FIG. 1.

Figure 4:
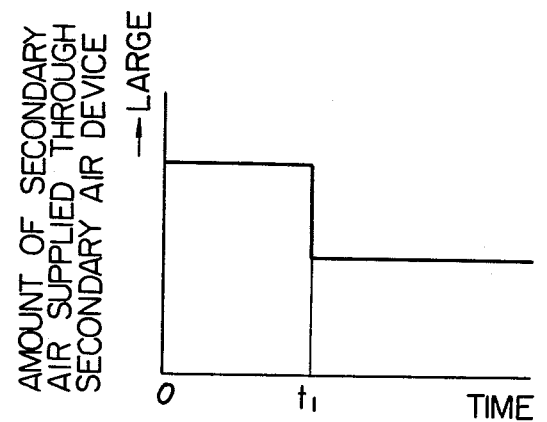
FIG. 4 is an operational diagram which shows the relationship between time and an amount of secondary air supplied through a secondary air device according to the present invention.
Figure 5:
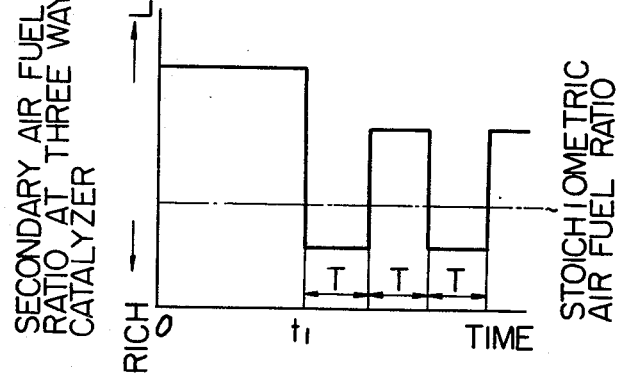
FIG. 5 is an operational diagram which shows the relationship between time and, a secondary air fuel ratio measured at three way catalyzer disposed at a position downstream of a joint of an exhaust pipe device according to the present invention.

The operation of the apparatus according to the present invention will now be explained with reference to FIGS. 3 through 5. While the engine is cold just after being started (time interval O to $t_1$ in FIGS. 3 through 5), the working chamber 17 of the air switching device 10 is supplied with a vacuum pressure which is less than the predetermined working pressure of the air switching device 10 (the solid line A in FIG. 3 shows the vacuum pressure in the working chamber 17a of the apparatus shown in FIG. 1 and the dot-dash line B in FIG. 3 show the vacuum pressure in the working chamber 17a of the apparatus shown in FIG. 2) and therefore, the air switching device is maintained open. Accordingly, in FIGS. 1 and 2, the secondary air supplied through the secondary air pipe 6 is supplied not only to be entrance pipe 3a via the communicating pipe 9 but also to the entrance pipe 3b via the communicating pipe 11. Therefore, as shown in FIG. 4, a large amount of secondary air is continuously supplied to the catalytic converter 4 (in FIGS. 1 and 2), comprising the three way catalyzer, through the first and second pipes 3a and 3b. The secondary air fuel ratio measured at the catalytic converter 4 is brought to the lean side of the stoichiometric air fuel ratio by way of the above-mentioned secondary air. This causes the conversion of undesirable components, such as HC, CO, which are generated by the rich mixture during operation of the choke in the carburetor and brings the catalyzer to the activating temperature in a short time.

When the engine is warmed up, the detecting-actuating device 21 supplies a sufficiently high vacuum pressure into the working chamber 17 of the air switching device 10 and, then, the switching device 10 is closed (at the time $t_1$ in FIG. 3). Thereafter the supply of secondary air through the air switching device 10 is stopped and secondary air is only supplied from the communicating pipe 9 into the entrance pipe 3a of the exhaust pipe device 3. Accordingly, exhaust gas including the secondary air passes through the entrance pipe 3a of the exhaust pipe device 3. On the other hand, exhaust gas including no secondary air passes through the entrance pipe 3b of the exhaust pipe device 3.

As mentioned above, the secondary air pipe 6 is communicated with the two communicating pipes 9 and 11 while the engine 1 is cold. However, when the engine is warmed up the secondary air pipe 6 is communicated with only the communicating pipe 9 and, consequently, the amount of secondary air supplied through the secondary air device is reduced as shown in FIG. 4. In addition, exhaust gas is alternately discharged from the entrance pipe 3a with the secondary air and from the entrance pipe 3b without the secondary air. This causes the oscillation of the secondary air fuel ratio measured at the catalytic converter. The oscillation is generated at a particular time interval T between the lean side and the rich side of the stoichiometric air fuel ratio as shown in FIG. 5. The undesirable components, such as HC, CO and $NO_x$, contained in the exhaust gas are effectively converted by the oscillation of the secondary air fuel ratio as mentioned above.

The interval T is determined by the way by in which the entrance pipes are communicated with the engine cylinders. When each of the entrance pipes is communicated with the two engine cylinders positioned subsequent to each other in the ignition sequence, the interval is $T_1$ and an amplitude is $A_1$. When each of the entrance pipes is communicated with the two engine cylinders positioned at alternate positions in the ignition sequence the interval is $T_2$ and an amplitude is $A_2$. The interval $T_1$ is almost twice as long as the interval $T_2$. However, the amplitude $A_1$ is larger than the amplitude $A_2$.

The above-mentioned explanation is directed to the case, as illustrated in the accompanying drawings, in which engines having four cylinders are described. However, the present invention can also be applied to engines which have six or more cylinders and engines which have two cylinders.

What we claim is:

1. An apparatus for purifying exhaust gas discharged from an internal combustion engine having a plurality of cylinders, which apparatus comprises:
    an exhaust pipe means provided with two entrance pipes wherein a first entrance pipe of said entrance pipes is communicated with one half of said cylinders and a second entrance pipe of said entrance pipes is communicated with the other half of said cylinders, a joint joining said entrance pipes together and an exit pipe extending from said joint;
    a three way catalyzer for converting said exhaust gas disposed at a position downstream of said joint;
    a secondary air means for supplying secondary air into said exhaust pipe means, said secondary air means being communicated with said first entrance pipe of said exhaust pipe means;
    an air switching mea ns, the entrance of which is communicated with said secondary air means and the exit of which is communicated with said second entrance pipe, for switching secondary air from said secondary air means toward said second entrance pipe; and
    a means for detecting an operating characteristic of the engine and for actuating said air switching means so as to stop supplying said secondary air through said air switching means after detection of the fact that said engine characteristic is within a predetermined range, and to cause the alternate oscillation between different air fuel ratios in the exhaust gas passing through said three way catalyzer.

2. An apparatus for purifying exhaust gas according to claim 1, which further comprises a secondary air supply means for supplying secondary air to said secondary air means, said secondary air supply means being connected to said engine.

3. An apparatus for purifying exhaust gas according to claim 1, which further comprises a power supply means for supplying power to said switching means, said power supply means being connected to said engine.

4. An apparatus for purifying exhaust gas according to claim 1, which further comprises:
    a secondary air supply means for supplying secondary air to said secondary air means, said secondary air supply means being connected to said engine; and
    a power supply means for supplying power to said switching means, said power supply means being connected to said engine, whereby the power supplied from said power supply means to said switching means is varied by said detecting-actuating means in accordance with the operating characteristic of said engine.

5. An apparatus for purifying exhaust gas according to claim 4, wherein said detecting-actuating means is a by-pass valve disposed in a cooling system of said engine, whereby when said by-pass valve detects that the temperature of the cooling water is lower than a predetermined valve, said by-pass valve discharges the power therefrom said power being supplied from said power supply means.

6. An apparatus for purifying exhaust gas according to claim 4, wherein said detecting-actuating means is a delay valve, whereby the power supplied from said power supply means is transmitted to said air switching means after a predetermined time delay.

7. An apparatus for purifying exhaust gas according to claim 4, wherein said power supply means is an intake passage of said engine and supplies an intake vacuum.

8. An apparatus for purifying exhaust gas according to claim 4, which further comprises a throttling element disposed at a position between said secondary air means and said first pipe of said exhaust pipe means.

9. An apparatus for purifying exhaust gas according to claim 4, wherein:
    said power supply means is an intake passage of said engine; and
    said detecting-actuating means is a by-pass valve disposed in a cooling system of said engine and said by-pass valve releases intake vacuum supplied from said intake pipe during the time said by-pass valve detects the fact that the temperature of the cooling water is lower than a predetermined value for supplying said secondary air into said second pipe through said air switching means.

10. An apparatus for purifying exhaust gas according to claim 4, wherein:
    said power supply means is an intake passage of said engine; and
    said detecting-actuating means is a delay valve having a predetermined delay time and is disposed at a position between said intake passage and said air switching means, said delay valve supplies intake vacuum from said intake passage into said air switching means after a predetermined time delay.

* * * * *